June 21, 1960 G. B. HARSHFIELD 2,941,525
HEATER

Filed Jan. 22, 1957 2 Sheets-Sheet 1

INVENTOR.
GARTH B. HARSHFIELD
BY
Horace B. Van Valkenburgh
ATTORNEY

June 21, 1960 G. B. HARSHFIELD 2,941,525
HEATER
Filed Jan. 22, 1957 2 Sheets-Sheet 2

INVENTOR.
GARTH B. HARSHFIELD
BY
Horace B. Van Valkenburgh
ATTORNEY

United States Patent Office 2,941,525
Patented June 21, 1960

2,941,525
HEATER
Garth B. Harshfield, Box 997, Farmington, N. Mex.
Filed Jan. 22, 1957, Ser. No. 635,348
3 Claims. (Cl. 126—85)

This invention relates to heaters, particularly useful in meter houses for pipe lines and the like, although not limited to such use.

Meter houses, utilized in connection with pipe lines, such as through which natural gas, crude oil or the like are moved, are normally unattended for considerable intervals. During warm weather, the gauges, recording meters and the like in such meter houses are not particularly affected by weather conditions, but since natural gas particularly may contain small amounts of moisture, which may collect in a gauge or meter, there is danger during cold weather of such collected moisture freezing and damaging or impairing the operation of the gauges and meters. For accessibility to the meters, gauges, valves and the like, the meter houses are generally placed above ground, but the pipe lines are ordinarily placed below ground and therefore are not subject to the same possibilities of freezing. The heaters of this invention may be used effective to heat such meter houses, particularly for a long period of time, and left unattended, but are, of course, useful in other places.

Among the objects of the present invention are to provide a novel heater particularly adapted for use in meter houses and the like; to provide such a heater which will operate satisfactorily over long periods of time when left unattended; to provide such a heater which is adapted to use combustible gas supplied from either the pipe line itself or an independent source; to provide such a heater which may be readily installed in a meter house; to provide such a heater which will discharge the products of combustion at an elevated position; to provide such a heater which has a relatively large radiating surface to minimize the loss of heat through the stack or flue; and to provide such a heater which is relatively simple in construction and therefore readily and economically manufactured. Additional objects of this invention, together with the novel features thereof, will become apparent from the description which follows, taken in connection with the accompanying drawings, in which:

Figure 1:
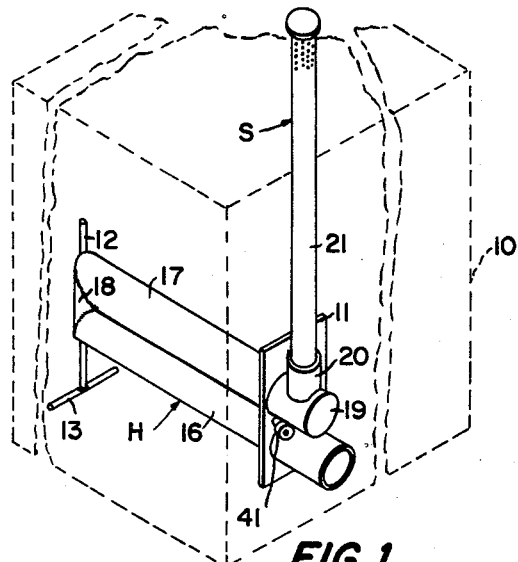
Fig. 1 is a perspective view of an installation, in a meter house shown in dotted lines, of a heater constructed in accordance with this invention.

As shown in Fig. 1, a heater H constructed in accordance with this invention may be installed in a meter house 10, the outline of which is indicated in dotted lines and which may vary considerably in construction. The heater H is readily installed in the meter house 10, or in any other building or room desired to be heated, since it may extend through only a single hole in the wall of the meter house 10, which hole may be covered by a plate 11 attached to the wall, as by bolts or in any other suitable manner, plate 11 also conveniently supporting the outer end of heater H. Adjacent plate 11 and outside the meter house, a flue or stack S may extend upwardly so as to carry away the products of combustion, preferably to a point above the top of the meter house. At its inner end, the heater H may be supported by a rod 12 conveniently having a transverse footing 13, such as formed of rod and welded to rod 12, the rod 12 conveniently being adjustable in a vertical sleeve 14 attached to the inner end of heater H and rod 12 being maintained in a desired position in a suitable manner, as by a clamping bolt or a set screw 15. As will be evident, the heater H is so constructed that it may be readily installed at a desired height in the meter house, so as to cause minimum obstruction to piping, meters, gauges and the like within the meter housing. Thus, a position for the heater may be selected which is convenient so far as piping, meters, gauges and the like are concerned.

The heater H may include a lower tube 16 and an upper tube 17 which are conveniently cylindrical and disposed in parallel relation, one above the other, with a burner B installed in the outer or inlet end of lower tube 16, and a flash arrester A attached to the inlet end of the lower tube. The inner ends of tubes 16 and 17 may be joined by a tubular fitting 18, adapted to form a 90° connection between tubes 16 and 17. Thus, the ends of fitting 18 may have a 45° bevel and the inner ends of the tubes 16 and 17 a corresponding bevel, so that the fitting 18 may be joined to the tubes 16 and 17, as by welding. Also, the tubes 16 and 17 pass through and are attached to plate 11 in a similar manner, as by welding. The hot gases produced by combustion at the burner B pass inwardly along the tube 16, then upwardly through the fitting 18 to tube 17, and thence outwardly along the tube 17 to the discharge end of the latter, which may be closed by a plate 19 which may be attached thereto in a suitable manner, as by welding. As will be evident, the relatively circuitous path of the hot gases, as well as the fact that heat may be radiated from all of the exterior surfaces of the tubes 16 and 17 and the fitting 18 within the meter house, provides and efficient heater and permits the heater to use the supply of fuel more effectively. The exhausted products of combustion, upon arrival at the outer end of upper tube 17, will pass through an exhaust fitting 20, conveniently welded to tube 17 at an aperture provided for the same and having a substantially smaller diameter than the tube 17, thus increasing the retention time of the combustion gases within the heater. Stack S may include a pipe 21 which may be threaded into or otherwise securely attached to exhaust fitting 20, while the top of the pipe 21 may be closed by a plate 22, which preferably has a larger diameter than the pipe. Pipe 21 may also be provided adjacent its upper end with a series of holes 23 disposed in axial and circumferentially spaced relation and which permit the products of combustion, by this time cooled, to be discharged into the atmosphere. Preferably, pipe 21 is sufficiently long that the upper end of the stack S will clear the meter house or other building in which the heater is installed, although this is not always absolutely necessary. The vertical extent of holes 23 is preferably only a small fraction, such as 5%, of the length of the pipe 21, to insure that any products of combustion, upon reaching holes 23, will be sufficiently cool that there will be no possibility of combustible gases or vapours which might be present around a meter house or the like being ignited. Also, the larger diameter of top plate 22 than pipe 21 minimizes the possibility of down drafts of wind from entering the holes 23 and reversing the flow of combustion products, although if this should happen the flash arrester A will prevent the ignition of any combustible gases or vapours at the inlet of the heater.

Figure 2:
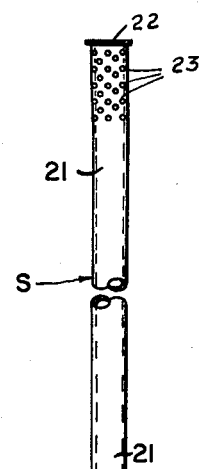
Fig. 2 is a side elevation, on an enlarged scale, of the heater of Fig. 1.
Figure 2:
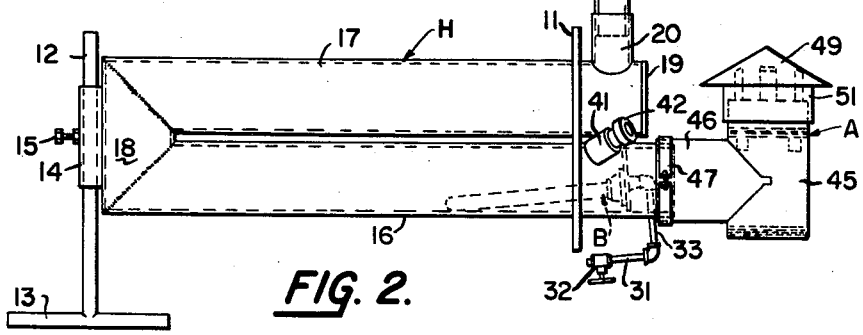
Figure 3:
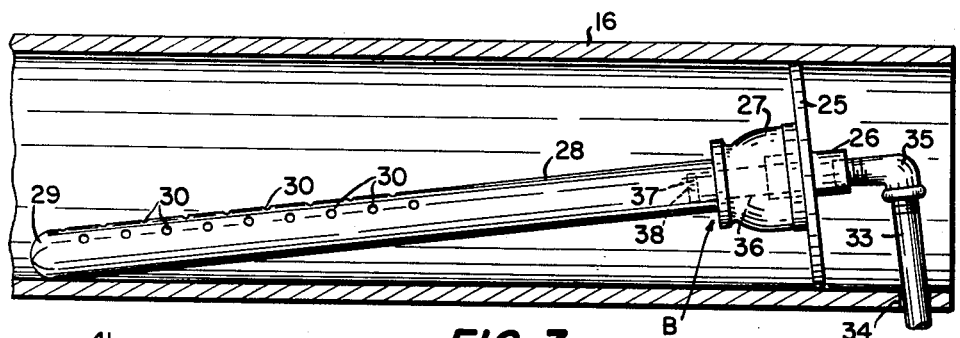
Fig. 3 is a fragmentary longitudinal section, on a further enlarged scale, of the lower portion of the heater of Fig. 2 and showing more particularly the burner.
Figure 4:
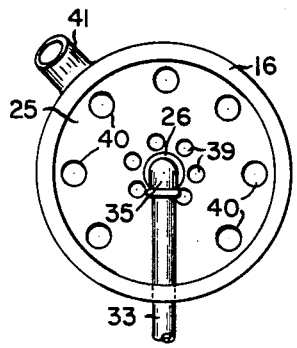
Fig. 4 is an end elevation of the parts of Fig. 3.

As illustrated in Figs. 3 and 4, the burner B may be formed primarily from conventional plumbing fittings, conveniently welded to a plate 25 which is generally circular, but may be somewhat elliptical in shape so as to fit within the interior of tube 16 at an angle, as in Fig. 3. The parts attached, as by welding, to plate 25 may include a coupling 26 extending therethrough and a reducer 27 extending to one side, into the smaller threaded end of the latter of which is inserted a pipe 28 which may be closed at its opposite end 29, as by a so-called "orange peel" welded joint, and provided with a series of fuel discharge holes 30 spaced axially in circumferential rows, but above the longitudinal center of the pipe. The size and number of holes 30 may be determined in accordance with conditions, such as the holes 30 being 1/8" in diameter when pipe 28 is 3/4" in diameter, with twelve holes 30 in each of three rows. The fuel, such as gas, may be supplied through a supply line 31 of Fig. 2 in which a valve 32 is placed exteriorly of the meter house or the like for adjustment of the flow of fuel to provide the desired burner operation. The supply line 31 may include a pipe 33 which extends through a hole 34 in tube 16, provided for that purpose and thence into a street L 35, or any other suitable type of fitting, for connection to coupling 26. From coupling 26, the gas flows through a nipple 36 provided with a plug 37 at its outer end having at its center an orifice 38, such as about 0.45 in. in diameter. As in Fig. 4, the plate 25 may be provided with an inner series of holes 39, such as about 3/16 in. in diameter and spaced annularly, which communicate with the interior of reducer 27 and supply air for primary combustion of the gas discharged through orifice 38 into the interior of pipe 28. Air for secondary combustion may be supplied through an outer series of holes 40, which are larger than holes 39, such as about 7/16 in. in diameter and spaced around the sides and top of the plate 25, and permit the passage of air to the outside of the pipe 28. Also, in order to permit observation of combustion at the burner pipe 28, a short tube 41 may be attached, at a suitable angle, to lower tube 16, as by welding, at a hole provided for that purpose, while the outer end of tube 41 may be interiorly threaded or otherwise formed, so that a sight glass and holder 42 may be attached thereto, as in Fig. 2. As will be evident, the combustion process may be observed through the sight glass and the flow of fuel adjusted by valve 32, until the combustion characteristics are those desired, such as a series of relatively short, secondary flames emanating from the holes 30.

Figure 7:
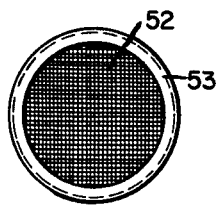
Fig. 7 is a top plan view of a screen used in the flash back arrester of Fig. 5.
Figure 8:
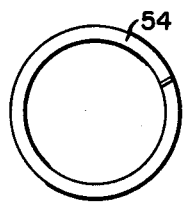
Fig. 8 is a top plan view of a spacing ring also used in the flash back arrester of Fig. 5.
Figure 5:
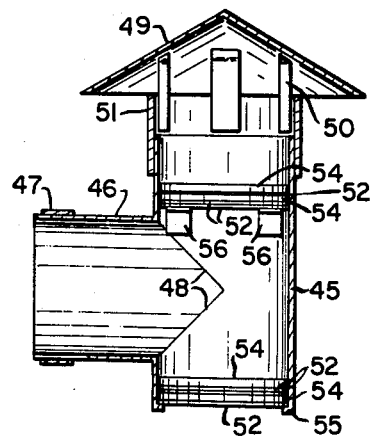
Fig. 5 is a vertical section of a flash back arrester shown installed on the heater in Fig. 2.
Figure 6:
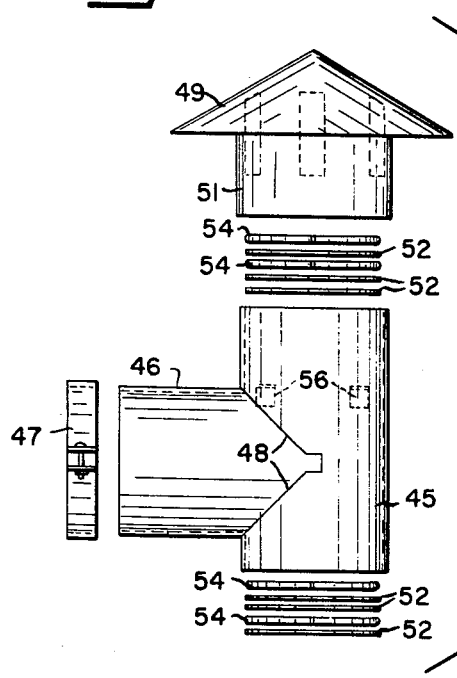
Fig. 6 is an exploded side elevation of the parts which form the flash back arrester of Fig. 5.

The flash arrester A may, as in Fig. 2, include an upright cylindrical housing 45 conveniently formed of sheet metal and attached, as by brazing, soldering or the like, to a short sheet metal tube 46 which is disposed at right angles to the center line of the former and is adapted to fit over the end of the lower burner tube 16 and to be attached thereto, as by a clamp 47. The joint 48 between housing 45 and tube 46 may have the configuration shown in Fig. 5, while the upper end of housing 45 may be provided with a conical cover 49 supported by a series of straps 50, as in Fig. 5, attached to cover 49 and also to a sleeve 51 adapted to be slipped over the upper end of housing 45. Within housing 45, and both above and below the joint 48, may be disposed a series of screens 52 which may be formed of brass or other suitable metal and having a relatively small mesh, such as 100 per inch. Each screen 52, as in Fig. 7, may be mounted in a clamping and supporting ring 53 which may be generally U-shaped in cross section and thus provided with a flange on each side, providing means for clamping the screen. Certain of the screens may also be spaced apart by spacing rings 54, shown also in Fig. 8, which are conveniently split rings to cause them to bear outwardly against the inside of housing 45 and hold the screens more securely in position. As in Fig. 5, the lower edge of housing 45 may be inturned to form a flange 55 for supporting the lower set of screens 52 and spacing rings 54, while the upper set of screens and spacing rings may be supported by angular tabs 56 riveted, welded or secured in any other suitable manner to the interior of housing 45 at a position above the upper edge of the opening leading to tube 46. As shown also in the exploded view of Fig. 6, one screen 52 may rest on the lower flange 55 with a spacing ring 52 thereabove, then a pair of screens 52 with a spacing ring 54 directly above the latter. Also, a pair of screens 52 may rest on tabs 56 with a spacing ring 54 thereabove and a single screen 52 and a spacing ring 54 above the latter. While any other suitable arrangement of screens or screens and spacing rings may be used, it will be evident that, in the arrangement shown in Figs. 5 and 6, any flash backs or flame tending to travel along combustible gases or vapours which might be introduced through the inlet, i.e., coming from the air outside the flash arrester A, rather than emanating from the heater, in attempting to travel outwardly, first encounter a pair of juxtaposed screens 52 and then a single screen disposed in spaced relation to the pair of screens. This will be true for any flashback tending to travel downwardly and out of the housing 45, or upwardly and out of the housing 45. With relatively fine mesh, metal screens, particularly when at least two are placed in juxtaposed position, it has been found that flashbacks may readily be avoided and also that the single, outer spaced screens further assist in preventing the ignition of any combustible gas or gases outside of the heater inlet. Since the effectiveness of a fine mesh screen as a flashback arrester is due primarily to fast conduction of heat away from the point or points of impingement of the flame, the screens 52 are preferably formed of a metal having a relatively high rate of heat conductivity, such as brass, as mentioned above, although other metals having similar characteristics will be found suitable.

From the foregoing, it will be evident that a heater, constructed in accordance with this invention, fulfills to a marked degree the requirements and objects hereinbefore set forth. As long as a fuel, preferably gas, is supplied through the inlet line 31 and air for combustion is supplied through the flash arrester A, the heater will operate satisfactorily over long periods of time when left unattended, since the intake of air is exteriorly of the meter house or other building in which the heater is installed. The gas for the burner B may be supplied from the pipeline itself, or from an independent source, although the former is most convenient for a gas pipeline. Due to the fact that it is necessary to cut only a single hole in the wall of the meter house or the like and the plate 11 is readily attached to the wall, while the adjustable rod 12 and footing 13 permit the heater to be installed at different elevations, the installation of the heater is relatively simple and also may be made with a minimum of interference with piping or the like inside the meter house. The flash arrester A, as well as the preferred length of the stack S, coupled with the radiation effectiveness of the tubes 16 and 17, avoids the ignition of any combustible mixture which might be present outside the meter house, while since that portion of the heater within the meter house is completely sealed, there is no way in which flame from the heater can ignite combustible gas or vapours in the meter house. Also, due to the circular shape of the tubes 16 and 17, as well as the connecting fitting 18 and the heat radiating effectiveness of the tubular parts, there is no tendency for "hot spots" to develop, which might raise the temperature of combustible gases or vapours in the meter house to the ignition point. Thus, the possibility of an accidental explosion is avoided. The discharge of the products of combustion at an elevated position and into the open atmosphere insures that no interference with a fresh supply of air to the inlet of the heater will be produced. The burner operates effectively, since air is supplied separately for primary and secondary combustion, while the preferred inclination of the pipe 28 in the inlet 16 assures a more even flow of air to the flames at the various orifices or holes 30. Since a larger proportion of the parts of the burner may be conventional plumbing fittings, and the assembly of the burner is simplified by the number of threaded joints used, although the welding operations involved are readily carried out, the burner is readily constructed. The stack S is readily made and also involves merely cutting a piece of standard pipe to the desired length and threading one end, if not already threaded, drilling a few holes, and then welding a plate to the top. The tubes 16 and 17 are readily cut to shape and welded to the fitting 18 as well as the supporting plate 11, while end plate 19 and outlet 20 are readily welded to tube 17, sleeve 14 to fitting 18, and sight glass tube 41 to tube 16. As will be evident, no welding or similar operations need be carried out inside the tubes 16 or 17, or fitting 18.

Although a preferred embodiment of a heater has been illustrated and described, it will be understood that other embodiments may exist and that various changes may be made therein, without departing from the spirit and scope of this invention.

What is claimed is:

1. In a heater including a horizontal tubular member, a burner disposed in said tubular member and comprising a plate having inlet and outlet sides and disposed transversely within and conforming to the interior of said tubular member, said plate having an inner series of circumferentially spaced holes and an outer series of circumferentially spaced holes disposed radially outwardly from said inner series of holes; a tube having a series of axially spaced holes along the upper portion thereof and closed at its outer end; tubular means joining the inner end of said tube to the outlet side of said plate at a circumferential position between said inner and outer holes; means forming a passage extending centrally through said plate from the inlet side thereof and terminating in an axially directed nozzle orifice within said tubular joining means; combustion air inlet means connected to said tubular member at the end thereof adjacent the inlet side of said plate; and means for supplying a combustible gas to said passage forming means.

2. In a heater as defined in claim 1, wherein said outer holes are larger than said inner holes and said outer holes extend in spaced relation around said plate except at and adjacent the bottom of said plate.

3. In a heater as defined in claim 2, wherein said tube is disposed at a slight angle to the axis of said tubular member; said tube is formed of pipe; said tubular joining means is a reducer pipe fitting; and said passage forming means includes a coupling pipe fitting extending centrally through said plate, a nipple connected to said coupling and a plug closing the outer end of said nipple and provided with said orifice.

References Cited in the file of this patent

UNITED STATES PATENTS

| | | |
|---|---|---|
| 752,805 | Schmidt | Feb. 23, 1904 |
| 1,020,119 | Wheelock | Mar. 12, 1912 |
| 1,246,682 | Thompson | Nov. 13, 1917 |
| 1,731,306 | Hileman | Oct. 15, 1929 |
| 1,932,242 | Burch | Oct. 24, 1933 |
| 2,220,582 | Ruckstahl | Nov. 5, 1940 |
| 2,495,673 | Erwin | Jan. 24, 1950 |
| 2,531,139 | Lilly et al. | Nov. 21, 1950 |
| 2,656,833 | Moran | Oct. 27, 1953 |
| 2,664,081 | Moran | Dec. 29, 1953 |